United States Patent
LaLiberte, Jr.

(10) Patent No.: US 9,909,329 B2
(45) Date of Patent: Mar. 6, 2018

(54) ANCHOR DEVICE POSITIONING AND PLUMBING TOOL AND METHODS RELATED THERETO

(71) Applicant: Gerald A. LaLiberte, Jr., Berkley, MA (US)

(72) Inventor: Gerald A. LaLiberte, Jr., Berkley, MA (US)

( * ) Notice: Subject to any disclaimer, the term of this patent is extended or adjusted under 35 U.S.C. 154(b) by 238 days.

(21) Appl. No.: 14/849,694

(22) Filed: Sep. 10, 2015

(65) Prior Publication Data

US 2017/0073986 A1  Mar. 16, 2017

(51) Int. Cl.
*G01C 9/02* (2006.01)
*E04G 21/18* (2006.01)

(52) U.S. Cl.
CPC .......... *E04G 21/185* (2013.01); *G01C 9/02* (2013.01)

(58) Field of Classification Search
CPC .... G01C 9/02; G01C 9/26; G01C 9/36; E04G 21/185; E04G 15/04; E04G 21/12; E04G 23/0218
USPC ........................................... 33/301, 404–407
See application file for complete search history.

(56) References Cited

U.S. PATENT DOCUMENTS

| | | | |
|---|---|---|---|
| 1,726,286 A | | 8/1929 | Bennet |
| 2,760,272 A | | 8/1956 | Van Cantie |
| 3,266,155 A | * | 8/1966 | Stanb ................. E04G 21/1808 33/370 |
| 4,194,237 A | | 3/1980 | Conklin |
| 4,532,718 A | * | 8/1985 | Copeland ................. G01C 9/28 33/286 |
| 4,627,140 A | * | 12/1986 | Davis ................... B25B 27/143 29/264 |
| 4,872,298 A | | 10/1989 | Klemic, Jr. |
| 4,970,797 A | * | 11/1990 | Sarasin ............... E04G 21/1808 33/404 |
| 4,976,041 A | * | 12/1990 | Oshiro .................... B44D 3/38 33/392 |
| 5,419,055 A | * | 5/1995 | Meadows ........... E04G 21/1808 33/404 |
| 5,542,187 A | * | 8/1996 | Oakley ............... E04G 21/1808 33/404 |

(Continued)

FOREIGN PATENT DOCUMENTS

CA      1042678     11/1978
CA      2579385     8/2012

(Continued)

*Primary Examiner* — Yaritza Guadalupe-McCall
(74) *Attorney, Agent, or Firm* — Chapin IP Law, LLC

(57) ABSTRACT

Featured are devices and methods for positioning an anchoring device (e.g., bolt, stud) when cast in place in concrete so as to leave the anchoring device plumb. Such methods include securing one end of an anchor plumbing tool having a leveling mechanism to the anchoring device and manipulating another portion of the plumbing tool until the leveling mechanism indicates that the anchoring mechanism is plumb. Such methods further include positioning the anchoring device in cast in place concrete while the concrete is in its fluid state before set up occurs so as to leave the anchoring device in a vertical or perpendicular line relative to gravity. Such a plumbing tool includes a distal end portion that removably couples to an end of the anchoring device, the leveling mechanism and an upper portion that is usable to manipulate the anchoring device.

21 Claims, 10 Drawing Sheets

(56) References Cited

U.S. PATENT DOCUMENTS

| | | | | |
|---|---|---|---|---|
| 6,029,359 | A * | 2/2000 | Szumer | G01C 9/28 33/373 |
| 6,124,935 | A * | 9/2000 | Matthews | G01B 11/27 33/286 |
| 6,431,517 | B1 | 8/2002 | Chapman | |
| 6,857,193 | B2 * | 2/2005 | Kallesen | G01C 15/008 33/286 |
| 7,225,589 | B1 | 6/2007 | Smith | |
| 7,310,888 | B2 * | 12/2007 | Gilliland | E04G 21/1808 33/404 |
| 7,360,315 | B2 * | 4/2008 | Knepp | E02D 5/38 33/370 |
| 8,621,816 | B1 | 1/2014 | Lin et al. | |
| 8,943,704 | B1 * | 2/2015 | Scammel | H02G 1/00 33/528 |
| 2007/0079521 | A1 * | 4/2007 | Hill | G01B 3/08 33/809 |
| 2007/0107339 | A1 | 5/2007 | Matsumoto | |
| 2007/0277976 | A1 * | 12/2007 | Kobetsky | F16B 13/065 166/250.01 |
| 2008/0152456 | A1 * | 6/2008 | Kobetsky | F16B 13/065 411/55 |
| 2009/0071093 | A1 | 3/2009 | Hidajat et al. | |
| 2010/0126084 | A1 * | 5/2010 | Sill | E04B 2/8617 52/127.3 |
| 2012/0192442 | A1 | 8/2012 | Song et al. | |
| 2013/0340267 | A1 * | 12/2013 | Carbajal | G01C 15/10 33/286 |
| 2014/0115907 | A1 * | 5/2014 | Gamon | G01C 15/004 33/286 |
| 2017/0073986 | A1 * | 3/2017 | LaLiberte, Jr. | G01C 9/02 |
| 2017/0152879 | A1 * | 6/2017 | Andou | F16B 13/068 |

FOREIGN PATENT DOCUMENTS

| | | |
|---|---|---|
| CN | 2596170 Y | 12/2003 |
| CN | 201650319 | 11/2010 |
| CN | 201770992 | 3/2011 |
| CN | 202037208 | 11/2011 |
| CN | 202214735 | 5/2012 |
| CN | 202280074 | 6/2012 |
| CN | 102677691 | 9/2012 |
| CN | 202830961 | 3/2013 |
| CN | 203238657 | 10/2013 |
| CN | 103672311 | 3/2014 |

* cited by examiner

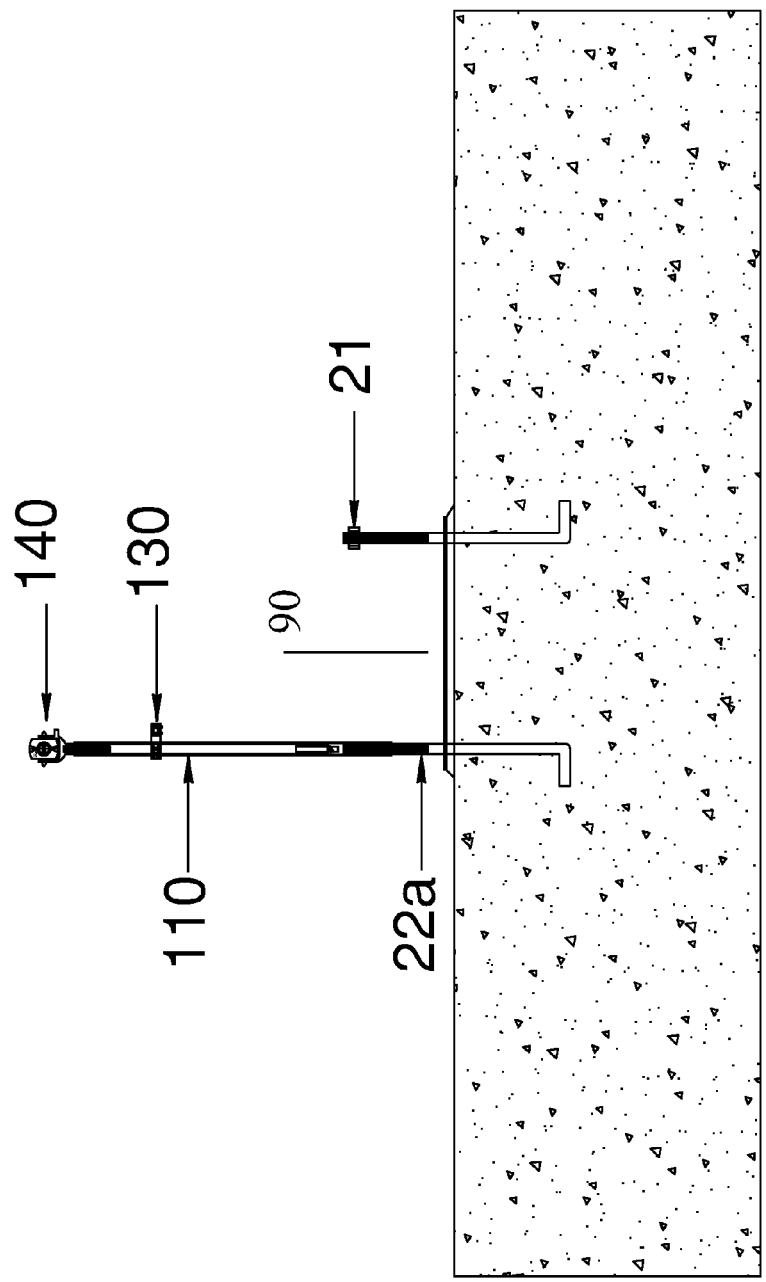

ANCHOR DEVICE POSITIONING AND PLUMBING TOOL AND METHODS RELATED THERETO

FIELD OF INVENTION

The present invention relates to devices and methods used in building construction and more particularly to devices and methods for positioning an anchoring device (e.g., bolt, stud, etc.) when cast in place so as to leave the anchoring device plumb. Even more particularly, the present invention features such devices and methods for positioning an anchoring device such as a bolt, stud or the like in cast in place concrete while it is in its fluid state before concrete set up occurs so as to leave the anchoring device in a vertical or perpendicular line relative to gravity.

BACKGROUND OF THE INVENTION

In the building or construction industry (commercial or residential), a building usually includes a foundation and a structure or superstructure that is used to generally form the building and which structure/superstructure is typically secured to the foundation using any of a number of mechanisms as are known in the art. One common technique used to secure the structure/superstructure to the foundation is to establish a mechanical connection between the foundation and the structure/superstructure where one part of the mechanical connection is embedded (e.g., cast in) in the foundation.

In commercial buildings such as office buildings, high rise tenement building (condo or apartments), stores (e.g., department stores) and mixed use buildings, structural steel or other material appropriate for the intended use, is typically used to form the structure/superstructure of the building and the foundations are formed using cast in place concrete which typically includes some form of steel re-enforcing (e.g., re-bar). These foundations also are formed so as to include one or more anchoring devices (e.g., bolts, studs) which form one part of the mechanical connection which secures the metal structure or superstructure to the foundation. In the case of wood frame residential buildings, one or more anchoring devices also are cast in the concrete footings or walls making up the foundation which are secured to the wood frame (e.g., sill or sill plate) by a mechanical connection such as for example, bolting or threaded connection.

As indicated herein, for foundations designed to accept structural steel buildings, an anchoring device 20 (FIG. 1) is installed in the foundation so the superstructure can be securely attached to the foundation on which it bears. The common practice in the past and present day is the use of an installation of anchor bolts 22 or studs that are cast into the foundation at a specific location, and elevation. More particularly, the building is engineered so as to specify a specific pattern of anchor bolts having a predefined spacing and orientation as well as specifying the size bolt (e.g., ¾ in., 1 in., 1½ in., 2 in., 3 in. etc.) and bolt material that are to be cast in the concrete.

A conventional anchor bolt is typically a steel member (e.g., high strength steel member) having a lower portion that is cast or embedded into the foundation and an upper threaded portion that is set plumb to accept a nut 21 and washer which will couple the structural steel member such as a column to the cast in place foundation below. The lower portion also is typically configured and arranged so it can be cast in the concrete and having a lower portion that is formed so as to include a portion that extends at an angle (e.g., perpendicular) to a long axis of the anchor bolt. The structural steel member or column is typically welded to a base plate of a designed or specified thickness, varying from column to column or member to member, with an identical bolt pattern in the foundation to which it will be set upon. Such specifying, designing, configuring and arranging is such that the mechanical connection that is formed can withstand anticipated static and dynamic design loads and forces on the specific connection. Such anchor bolts are placed in foundation walls, pilasters, and interior spread footings.

A common practice or technique for setting anchor bolts 22 or anchoring devices 20 in place involves the use of an anchor bolt template 30 whether it is made of wood on the jobsite, or to use the leveling plate in which the structural member or column will later be set upon. Such an anchor bolt template 30 is typically set on a spreader 40 which spans from one side of the concrete form 50 to the other side. The concrete form being the form created so as to control the formation of the concrete structure which the structural member or column bears. The location of the template 30 is set by field engineers or surveyors before and during the concrete casting process. Most often center lines are drawn upon the template and engineers survey and set the location by a transit and tape measure, or most commonly by a Total Station Instrument, combined with the use of a surveyor's prism. In this way, the location and elevation of the individual anchor bolts is set to the desired values.

When placing concrete in the forms, however, the resulting pressures move the forms and anchor bolts laterally. See for example, FIG. 1 which illustrates rotation of the anchor bolts as the concrete is being placed in a footing form. As a result, those pressures pairing with the flowing concrete inside the formwork 50, 60 require the realigning, straightening, and plumbing of the forms as well as the anchor bolts following the casting process (i.e., before the concrete can set-up). After realigning the forms and relocating the anchor bolt template to its desired location, the anchor bolts must me plumbed up manually.

It is typical on most foundations that the plans call for different anchor bolt projections out of the foundation due to the varying base plate thicknesses of the structural member or column. This routinely presents a problem for the anchor bolt installer when forming wide foundation spread footings. When forming wide spread footings, deeper spreaders 40 (e.g., 2×8 inch material) are needed to be able to handle the weight of the anchor bolt template and the additional weight of one or two men placing the concrete, in addition to the man checking and adjusting the anchor bolts after concrete placement is complete. The deeper spreader creates the problem of minimal bolt projection above the supporting nut for the installer to accurately plumb the anchor bolt when in its final state in the curing concrete.

Because of this reduced projection, a common practice that has developed is to pull the anchor bolt up through the template outwardly from the concrete to allow the use of a torpedo level or Spirit level. The torpedo level is then placed against the vertical plain of the bolt on two perpendicular sides of each individual bolt in the template. Once the bolt is plumbed using the torpedo level, the anchor bolt is then manually pushed back down into the wet concrete until it again contacts the supporting surface of the template. As the bolt plunges downward into the concrete, however, there is no way to insure the anchor bolt or bolts are truly plumb or remain plumb. Typically, the downward plunge is many times misjudged which results in the bolts being misaligned and needing costly adjustment after the concrete is set and the forms stripped and removed from the placement. Too often the anchor bolts or anchoring devices 20 are out of plumb and in different directions from the other bolts within the same template. Anchor bolt as-built's or final locations are performed usually within a day or two after the casting process. Quite often, however, the anchor bolts are found out of plumb during the as-built process due to the issues stated above.

As indicated above, using conventionally installation techniques, the anchor bolts are out of plumb and in different directions from the other bolts within the same template. As a result, any one of a number of actions may be required to correct the as-built condition of a given bolt to the as-designed location. Such actions increase costs for the lost time associated with correcting the condition as well as possibly causing a delay in schedule which can equate to increased costs. Also, in some cases the structural member or column (e.g., baseplate therefor) is modified to suit the as-built condition of the anchor bolts, such as for example cutting the baseplate off the column in the field and then welding a replacement baseplate onto the column also in the field.

It thus would be desirable to provide a new device and related methods for positioning and plumbing an anchoring device in its final set location. It would be particularly desirable to provide such a device and related methods that would allow one to easily obtain accurate as-builts of the anchoring device locations when cast in place. It also would be desirable to provide such a device and related methods which would minimize the time and expense associated with miss-located anchoring devices as compared to prior art devices and prior art methodologies.

SUMMARY OF THE INVENTION

In broad aspects, the present invention features devices and methods for positioning an anchoring device (e.g., bolt, stud, etc.) when such an anchoring device is cast in place in a medium such as concrete so as to leave the anchoring device plumb. Such methods also include securing one end of an anchor plumbing tool having a leveling mechanism to the anchoring device and manipulating another portion of the plumbing tool until the leveling mechanism indicates that the anchoring mechanism is plumb. Such methods further include positioning the anchoring device in cast in place concrete while the concrete is in its fluid state before set up occurs so as to leave the anchoring device in a vertical or perpendicular line relative to gravity. In this way, when the concrete sets up (e.g., hardens) the anchoring device is preferably oriented plumb and so that the structure or superstructure can be properly secured to the anchoring device and thus to the attaching structure or superstructure.

According to one aspect of the present invention there is featured a device for plumbing an anchoring device in a cast in place medium. In illustrative embodiments such a device is useable for plumbing an anchoring device such as a bolt, stud, threaded sleeve or the like as is known to those skilled in the building arts (e.g., building engineering or construction arts) that are placed in a medium such as concrete and more particularly, placed or disposed in a form in which the medium or concrete is to be poured. In even more particular, illustrative embodiments, such an anchoring device or plurality of devices are placed at or about a given location within such a form. In yet even more particular, illustrative embodiments, a mechanism such as a template or a leveling plate is provided and localized with respect to a given location or spatial point of reference and the anchoring device or plurality of devices are coupled or secured to the template or a leveling plate in such a fashion so as to establish an initial position of the anchoring device(s) at or about a given location within such a form.

In further aspects/embodiments, such a plumbing device includes a first member having a proximal end, a distal end and a long axis, a second member having a proximal end and a distal end and a leveling mechanism being secured to the first member so that the leveling mechanism provides one or more indicia representative of the orientation of the first member long axis with respect to vertical reference or gravity. The second member distal end is configured and arranged so as to be removably coupled to an end portion of the anchoring device. The second member proximal end and the first member distal end are respectively configured and arranged so that the first and second members are removably coupled to each other and so as to form an essentially unitary structure.

In further embodiments, the anchoring device end portion is arranged so as to form a threaded end, and the second member distal end includes a threaded aperture that is configured and arranged so as to threadably engage the threaded anchoring device end portion. In this way, the second member distal end is removably coupled to the anchoring device end portion.

In yet further embodiments, the second member distal end includes an aperture that is configured and arranged so as to slidably engage opposing surfaces of the anchoring device end portion thereby removably coupling the second member distal end to the anchoring device end portion.

In yet further embodiments, the first member includes a length along the long axis that is sufficient to allow the user to manipulate the anchoring device when disposed in the medium so the user can orient the anchoring device in at least the vertical direction so as to thereby plumb the anchoring device.

In yet further exemplar embodiments, the leveling mechanism is a bubble level device that is configured and arranged so as to allow the anchoring device to be leveled in two directions. Alternatively, the leveling mechanism includes a plurality of bubble level devices (e.g., a plurality of torpedo type levels) that are each arranged so as to be disposed along the first member long axis and so as to be about orthogonally spaced from each other. Each of these bubble level device provides an indicia representative of the orientation of the first member long axis with respect to a given plane of reference, thereby allowing the anchoring device to be leveled in two directions.

In yet further aspects/embodiments of the present invention, such a plumbing device further includes a locating device that is useable to determine the location of the locating device with respect to a spatial point of reference (e.g., determine a location in two or three dimensions). In addition, the first member proximal end is configured and arranged so to be removably coupled to the locating device so it is located at a known location with respect to the first member long axis. In more particular embodiments, the locating device is arranged on the first member such that the determined location of the locating device is representative of the location of the anchoring device with respect to the spatial point of reference (e.g., in two or three dimensions with respect to the spatial point of reference).

According to yet another aspect of the present invention there is featured a method for plumbing an anchoring device having a long axis that is disposed in medium before the medium sets up. In more particular embodiments, such a method embodies the plumbing device or tool as described herein. In illustrative embodiments such a method is useable for plumbing one or more (e.g., a plurality) anchoring devices such as a bolt, stud or the like as is known to those skilled in the building arts (e.g., building engineering or construction arts) that is/are placed in a medium such as concrete and more particularly, placed or disposed in a form in which the medium or concrete is to be poured. In even more particular, illustrative embodiments, such an anchoring device or plurality of devices are placed at or about a given location within such a form. In yet even more particular, illustrative embodiments, such a method(s) includes providing and localizing a mechanism, such as a template or leveling plate, with respect to a given location or spatial point of reference and coupling or securing the anchoring device or plurality of devices to the template or a leveling plate in such a fashion so as to establish an initial position of the anchoring device(s) at or about a given location within such a form.

Further, such a method includes removably coupling a proximal end of a second member having a long axis to a distal end of a first member also having a long axis so as to form a unitary structure where the long axis of each of the first and second members is generally aligned with each other and securing a leveling mechanism to the first member so that the leveling mechanism provides one or more indicia representative of the orientation of the first member long axis with respect to vertical reference or gravity. Such a method also includes removably coupling a distal end of the second member to an exposed portion of the anchoring device after pouring of the medium, further, the leveling mechanism thereby provides one or more indicia representative of the orientation of the anchoring device long axis with respect to the vertical reference. It should be recognized that it is within the scope of the present invention for removably coupling the second member distal end to the exposed portion of the anchoring device and thereafter coupling the first and second members to each other as herein described.

Such a method also includes determining from the leveling mechanism if the anchoring device is plumb. In addition, such a method includes in response to determining that the anchoring device is not plumb, manipulating the coupled first and second members so as to thereby also manipulate the anchoring device while disposed in the medium. Also the method includes repeating said steps of determining and manipulating until it is determined that the anchoring device is in a plumb condition. This is particularly advantageous as it avoids the positioning uncertainty introduced when using the conventional technique where at least a substantial portion of the anchoring device is pulled out of the medium.

In further embodiments of such a method, said removably coupling the second member distal end to the anchoring device exposed portion includes; configuring the anchoring device end portion so as to form one portion of a threaded connection, configuring the second member distal end so as to include another portion of a threaded connection, and threadably engaging the one portion and the another portion thereby removably coupling the second member distal end to the anchoring device end portion.

In yet further embodiments, the second member distal end includes an aperture that is configured and arranged so as to slidably engage opposing surfaces of the anchoring device end portion; and said removably coupling the second member distal end to the anchoring device exposed portion includes engaging the anchoring device end portion in the aperture. In this way, the second member distal end is removably coupled to the anchoring device end portion.

In yet further aspects embodiments, such a method further includes configuring the first member so as to have a length along the long axis that is sufficient to allow a user to manipulate the anchoring device when disposed in the medium so the user can orient the anchoring device in at least the vertical direction so as to thereby plumb the anchoring device. Without being bound by any particular theory, the length of the first member is such as to create a lever arm that can be used by the user to manipulate the anchoring device in the poured medium or concrete. In yet further embodiments, the combined longitudinal length of the first and second members is established so as to create such a lever arm.

In yet further aspects/embodiments the first and/or second members also are configured and arranged (e.g., have a thickness) and are made of a material (e.g., steel, stainless steel, aluminum, titanium, composites) that will withstand the loads, forces and torques being developed. More particularly withstand the loads, forces and torques being created when the user is manipulating the unitary structure or lever arm such as when trying to re-orient the anchoring device in the poured medium or concrete so that the anchoring device is in a plumb condition.

In yet further aspects/embodiments, the leveling mechanism is a bubble level device that is configured and arranged so as to allow the anchoring device to be leveled in two directions. Also, said determining from the leveling mechanism if the anchoring device is plumb includes using the bubble level device to determine if the anchoring device is plumb.

In yet further aspects/embodiments, the leveling mechanism alternatively includes a plurality of bubble level devices (e.g., a plurality of torpedo type of levels) that are each arranged so as to be disposed along the first member long axis and so as to be about orthogonally spaced from each other. Each bubble level device provides an indicia representative of the orientation of the first member long axis with respect to a given plane of reference, thereby allowing the anchoring device to be leveled in two directions. Also, said determining from the leveling mechanism if the anchoring device is plumb includes using the plurality of bubble level devices to determine if the anchoring device is plumb. It should be recognized, that other leveling mechanism as are known in the art, such as digital leveling mechanisms can be adapted for use as a leveling mechanism of the present invention.

In yet further aspects/embodiments, such a method further includes coupling a locating device that is useable to determine the location of the locating device with respect to a spatial point of reference on the first member proximal end, wherein the locating device is located at a known location with respect to the first member long axis.

In yet further aspects/embodiments, such a method of the present invention is adaptable for use with a plurality of anchoring devices that are disposed at or about a given location(s) in the medium. In yet further illustrative aspects/embodiments, such a plurality of anchoring devices can be arranged so as to form a pre-determined pattern at or about the given location(s). In more specific embodiments, there are 3 or more, 4 or more, 5 or more, six or more, 7 or more or 8 or more anchoring devices disposed at or about a given location(s) in the medium and such anchoring devices also can be arranged so as to form a predetermined pattern (e.g., a box pattern, a rectangular or circular pattern) at or about the given location(s).

In yet more particular embodiments such methods further include said removably coupling including removably coupling a proximal end of each of a plurality of second members to a distal end of each of a plurality of respective first members so each so coupled first and second members form a unitary structure, and said securing a leveling mechanism includes securing the leveling mechanism to each of the plurality of first members so that the leveling mechanism provides one or more indicia representative of the orientation of the respective first member long axis with respect to vertical reference. Also, said removably coupling includes removably coupling the distal end of each of the plurality of second members to an exposed portion of a respective one of the plurality of anchoring devices after pouring of the medium, whereby the leveling mechanism thereby provides one or more indicia representative of the orientation of the respective anchoring device long axis with respect to the vertical reference.

Further, said determining includes determining from the leveling mechanism if each of the plurality of anchoring devices is plumb and in response to determining that a respective anchoring device is not plumb, manipulating the coupled first and second members so as to thereby also manipulate the respective anchoring device while disposed in the medium. Such a method further includes, said repeating said steps of determining and manipulating includes repeating said steps of determining and manipulating until it is determined that the respective anchoring device is in a plumb condition and until it is further determined that each of the plurality of anchoring devices is in a plumb condition.

In yet further aspects/embodiments, such a method of the present invention is adaptable for use with a plurality of anchoring devices that are disposed at or about a given location(s) in the medium. In such a method of plumbing the plurality of anchoring bolts involves the use of a single plumbing device or plumbing tool that is successively coupled to each of the plurality of anchoring devices. In other words, the plumbing device or tool is successively coupled to and decoupled from each of the plurality of anchoring devices. Thus, such a method according to this aspect/embodiment of the present invention includes successively repeating the following steps for each of the plurality of anchoring devices.

More particularly, such a method further includes said removably coupling the distal end of the second member including removably coupling the second member distal end to an exposed portion of a respective one of the plurality the anchoring device after pouring of the medium, whereby the leveling mechanism thereby provides one or more indicia representative of the orientation of the respective one anchoring device long axis with respect to the vertical reference.

Also, said determining includes determining from the leveling mechanism if the respective one of the anchoring devices is plumb. In response to determining that a respective one of the anchoring devices is not plumb, such a method further includes manipulating the coupled first and second members so as to thereby also manipulate the respective one of the anchoring devices while disposed in the medium and repeating said steps of determining and manipulating until it is determined that the respective one of the anchoring devices is in a plumb condition. In addition, responsive to a determination that the respective one of the anchoring devices is plumb, such a method further includes decoupling the second member distal from the exposed portion of the respective one of the plurality the anchoring devices. As indicated herein after such decoupling the second member distal is then coupled to the exposed portion of said another respective one of the plurality the anchoring devices and the process of plumbing is continued for the another respective one of the plurality of anchoring devices. This coupling, anchoring device plumbing, and decoupling is repeated until all of the plurality of anchoring devices are subject to the plumbing process.

According to yet another aspect of the present invention there is featured a method for determining the location of an anchoring device(s) having a long axis with respect to a spatial point of reference (e.g., in one, two or three dimensions) and where the anchoring device is disposed in a medium such as concrete after the medium has set up. More particularly, such a method is usable to determine or shoot the as-built locations of the anchoring device(s) that have been cast in place in the medium and/or structure (e.g., form) containing the medium/concrete. Such a process is usually performed so as to determine if the anchoring device(s) has/have somehow deviated from the position it was placed in after the medium was poured and to confirm the placement location of the anchoring device prior to placement of the structural member(s). As a practical matter, one does not want to find out that the anchoring devices are out of location while trying to place the structural member(s).

Such a method for determining the location of an anchoring device(s) with respect to a spatial point of reference includes removably coupling a proximal end of a second member having a long axis to a distal end of a first member also having a long axis so as to form a unitary structure where the long axis of each of the first and second members is generally aligned with each other and removably coupling a distal end of the second member to an exposed portion of the anchoring device. As indicated herein, the second member distal end can be coupled to the exposed portion and then the first and second members coupled to each other.

Such a method further includes coupling a locating device on a proximal end of the first member, wherein the locating device is located at a known location with respect to the first member long axis. Also, using the so coupled locating device, the method includes determining the location of the locating device with respect to the spatial point of reference, where such determining also includes determining the location of the anchoring device with respect to the spatial point of reference. As indicated herein, the location of the anchoring device can be determined in one, two or three dimensions with respect to the spatial point of reference.

In yet further aspects/embodiments, such a method for determining the location of an anchoring device includes securing a leveling mechanism to the first member so that the leveling mechanism provides one or more indicia representative of the orientation of the first member long axis with respect to vertical reference, and determining from the leveling mechanism if the anchoring device is plumb.

In yet further aspects/embodiments, there are a plurality of anchoring devices. Such a method further includes repeating said steps of removably coupling a proximal end of a second member, removably coupling a distal end of the second member, coupling a locating device and determining the locations of the locating device and anchoring device with respect to the spatial point of reference for each of the plurality of anchoring devices.

The above devices and methods of the present invention are particularly advantageous, as they provide the capability to plumb the anchoring device (e.g., anchor bolt) accurately when in its final set location without having to remove the anchor bolt in an upward motion and reset downward as is done with some conventional techniques. An additional benefit to the devices and methods of the present invention is the capability of the device to be easily adapted for combined use with a known locating device such as a common peanut prism whereby one can easily obtain accurate as-builts for the anchoring device.

Other aspects and embodiments of the invention are discussed below.

Definitions

The instant invention is most clearly understood with reference to the following definitions:

USP shall be understood to mean U.S. Patent Number and U.S. Publication No. shall be understood to mean U.S. Published Patent Application Number.

The terms "comprising" and "including: as used in the discussion directed to the present invention and the claims are used in an open-ended fashion and thus should be interpreted to mean "including, but not limited to." Also the terms "couple" or "couples" is intended to mean either an indirect or direct connection. Thus if a first component is coupled to a second component, that connection may be through a direct connection, or through an indirect connection via other components, devices and connections. Further the terms "axial" and "axially" generally mean along or substantially parallel to a central or longitudinal axis, while the terms "radial" and "radially" generally mean perpendicular to a central, longitudinal axis.

Additionally directional terms such as "above," "below," "upper," "lower," etc. are used for convenience in referring to the accompanying drawing figures. In general, "above," "upper," "upward" and similar terms refer to a direction toward a proximal end of an instrument, device, apparatus or system and "below," "lower," "downward," and similar terms refer to a direction toward a distal end of an instrument, device, apparatus or system, but is meant for illustrative purposes only and the terms are not meant to limit the disclosure.

As-built is a term used commonly in the construction industry and shall be understood to relate to a survey to ascertain the location with respect to grid or column lines the final location of footings, walls, columns or anchoring devices such as cast in place anchor bolts.

Column shall be understood to mean a vertical support made of concrete or structural steel.

Column lines shall be understood to mean reference lines that are drawn on building construction plans in which structural steel columns are erected or referenced.

Footing shall be understood to mean the lower part of a foundation of a column, wall, building, etc.

Jig shall be understood to be referring to a device for accurately speeding up a repetitive process like cutting, drilling, sawing, laying out dimensions.

Peanut Prism shall be understood to mean a tool small in size used by field engineers or surveyors for accurately locating property lines, buildings, layout of columns, piers, and walls. A peanut prism is partnered with a transit which has the ability to direct infrared light from the transit to a prism varying distances away from the transit. The transit calculates the time the light takes to go to the prism and back to the surveyor's transit and accurately calculates the distance from the transit to the prism.

Pilaster shall be understood to mean a shallow rectangular or square column projecting from a wall.

Plumb shall be understood to mean a vertical or perpendicular line relative to Earth's gravity.

Spirit Level shall be understood to mean a device for determining a true horizontal or vertical direction perpendicular or parallel to the direction of the Earth's gravity by centering a bubble in a glass tube of alcohol or ether.

Spreader shall be understood to mean a device for keeping apart two objects from reacting inward towards a center. In this case a spreader has two jobs. It maintains a spread distance for the top of concrete formwork (footings, walls, pilasters), from reacting inward due to the pressure of fluid concrete being placed at the bottom of the forms. It also supports and maintains the position of a template which holds and maintains the column anchor bolts during the concrete placing process.

Template shall be understood to mean a wooden or steel base with centerlines which establish the position of the anchor bolts it holds during concrete placement.

Total Station shall be understood to mean an electronic/optical instrument used in modern surveying. The total station is a theodolite (transit) integrated with an electronic distance meter (EDM) to read horizontal, vertical, and slope distances to a point in space.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 11 is another section view of the spreading footing with the anchoring devices cast in place and the anchor plumb device of the present invention configured for as-building the final locations of the anchoring devices.

DESCRIPTION OF THE PREFERRED EMBODIMENT

Figure 1:
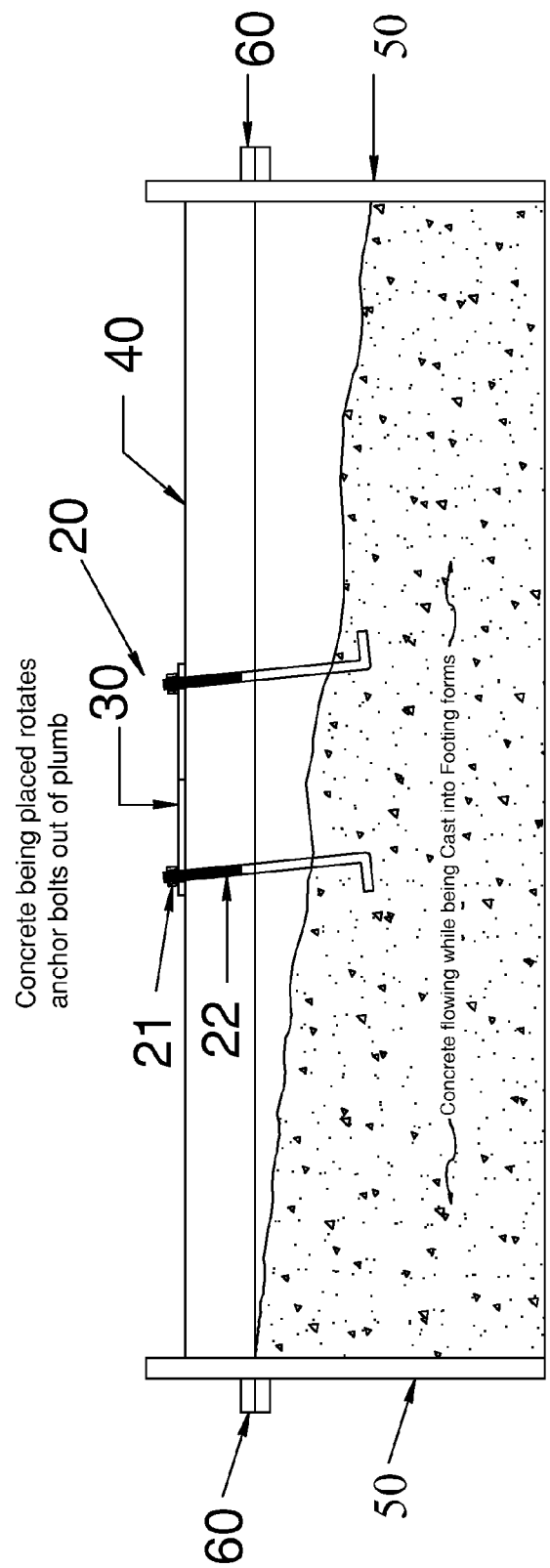
FIG. 1 is a section view of a spread footing illustrating movement of anchor bolts in the footing as a result of concrete flowing while being cast into the footing forms.
Figure 2:
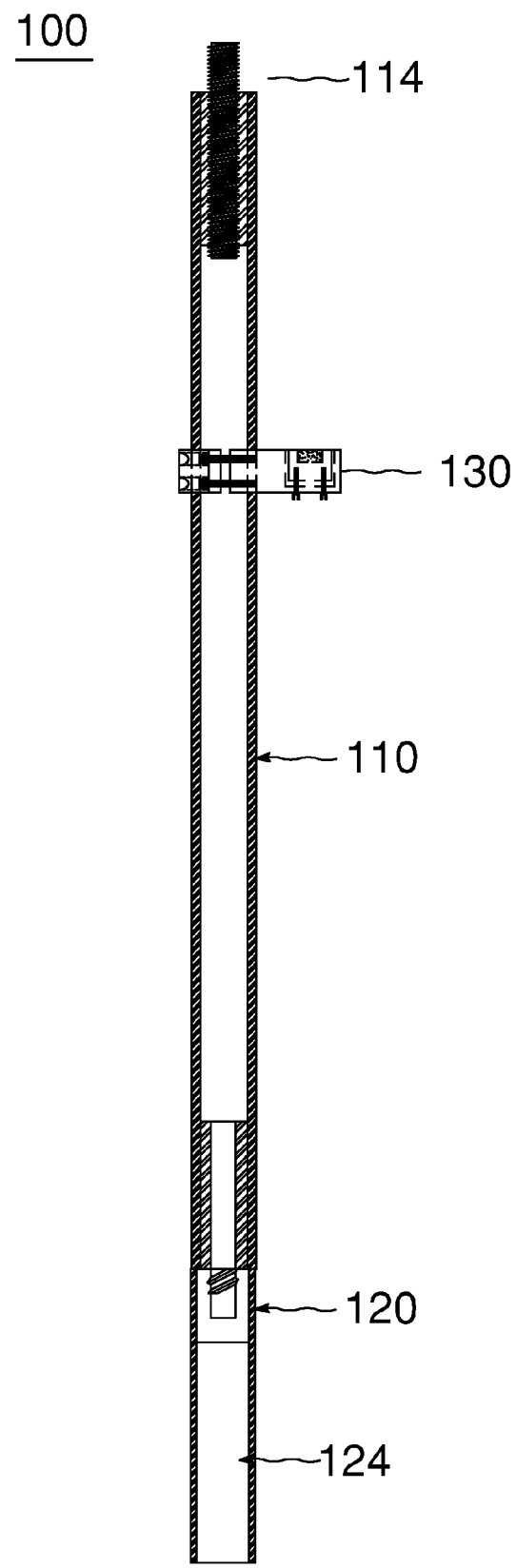
FIG. 2 is a side view of an anchor plumb device or tool of the present invention.
Figure 3:
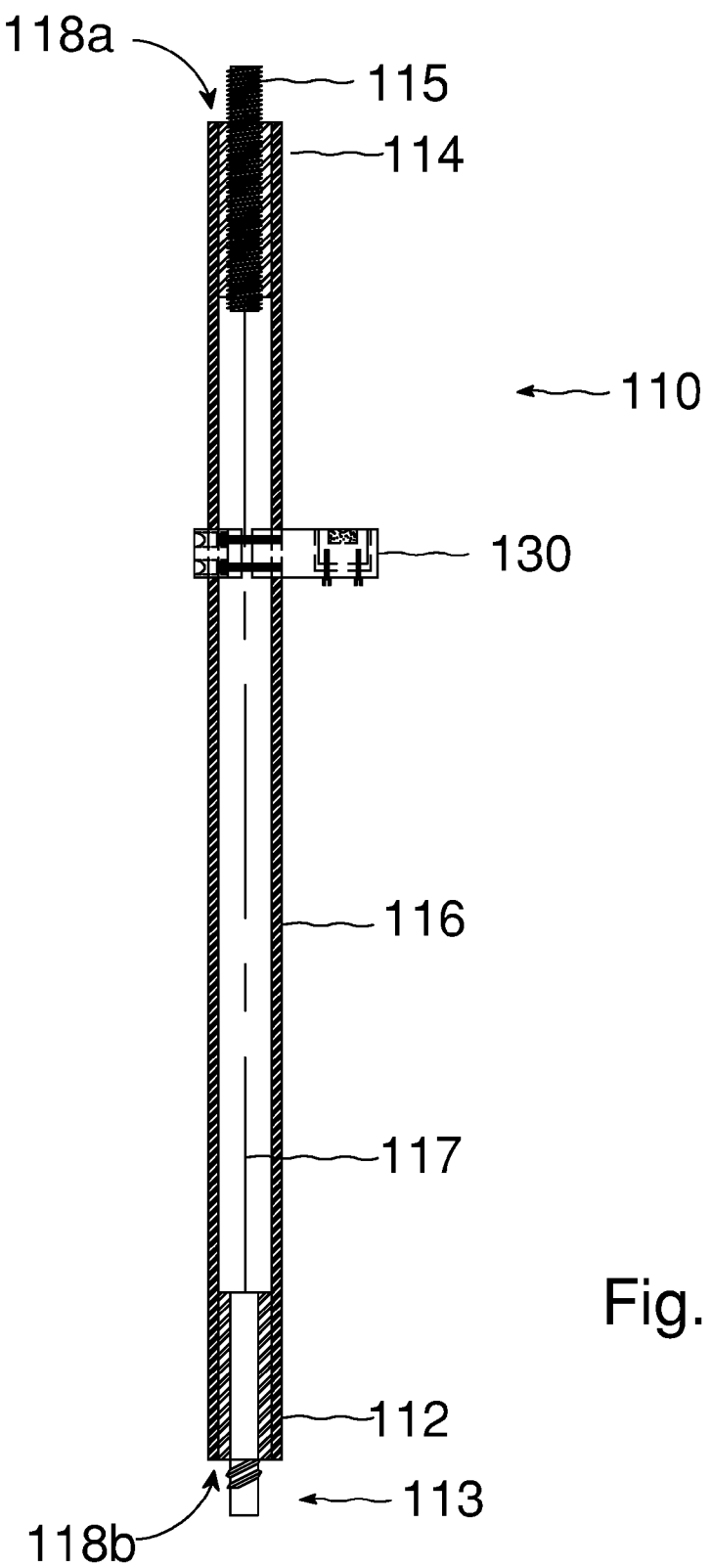
FIG. 3 is a cross sectional side view along the long or longitudinal axis of a first member of the anchor plumb device/tool.
Figure 4:
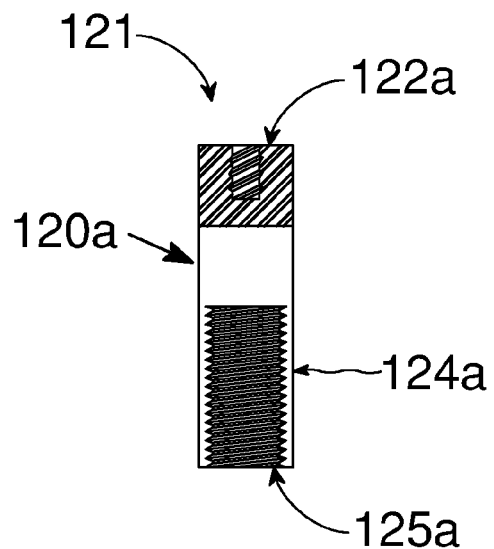
FIG. 4 is a cross-sectional side view along the long axis of a second member or anchor device adapter of the present invention.
Figure 5:
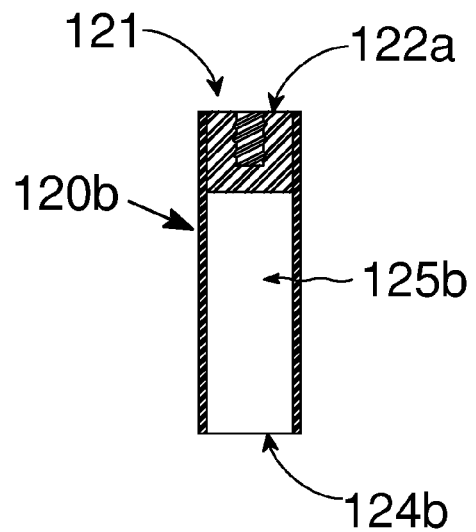
FIG. 5 is another cross sectional view of another embodiment of a second member or anchor device adapter according to the present invention.

Referring now to the various figures of the drawing wherein like reference characters refer to like parts, there is shown respectively in FIGS. 2 and 3, a side view of an anchor plumb device 100 or tool of the present invention (FIG. 2) and a cross sectional side view along the long axis 117 or longitudinal axis of a first member 110 of the anchor plumb device/tool. Such an anchor plumb device 100 also includes a second member 120 or adapter that is removably coupled to the first member in such a way that the coupled first and second members form a unitary structure. Embodiments of such a second member 120*a, b* are shown in FIGS. 4 and 5 and described hereinafter. Such an anchor plumb device 100 further includes a leveling mechanism 130 which is used in combination with the unitary structure to determine if the anchor plumb device 100 and thereby the anchoring device 20 removably coupled thereto are plumb.

In regards to the second member, when referring in general to the second member the following discussion will refer to reference numeral 120, however, when making reference to one of the specific embodiments, reference shall be to the numbering as provided in FIGS. 4-5.

As described further herein in more detail, such an anchor plumb device 100 is particularly suited for being removably coupled to any of a number of anchoring devices 20 as are known in the construction or building construction arts so that a construction worker or other construction personnel can manipulate the anchor plumb device 100 and thereby also manipulate the anchoring device 20 when it is disposed in a medium such as concrete. Such anchoring devices include, but are not limited to, anchor bolts, studs, threaded sleeves and the like. In this way, the worker can manipulate the anchoring device so that it is in a plumb condition before the medium/concrete has set up without having to pull the anchoring device upwardly and partially out of the medium and then re-insert it back into the medium as is done with a number of conventional techniques. This process can be repeated for each anchoring device 20 that is disposed in the medium/concrete.

Such an anchor plumb device 100 also is suitable for allowing a surveyor or surveying crew or the like to removably secure/couple a surveying device (e.g., peanut prism 140) to an end of the anchor plumb device as described below in connection with FIG. 11. As is known to those skilled in the art, such a surveying device or peanut prism 140 or position locating device can be used with any of a number of other surveying devices or surveying instruments (as are known in the art), such as a transit or total station which embodies an electronic distance meter (EDM), to read horizontal, vertical, and slope distances to a point in space. In this way, the location of the anchor plumb device 100 and thus the location of the anchoring device it is coupled to can be easily and accurately determined in one dimension, two dimensions or three dimensions with respect to a spatial reference point. More particularly, such a position of the anchoring device can be directly determined using the anchor plumb device of the present invention.

In sum, the anchor plumb device 100 of the present invention can be used to position an anchoring device 20 accurately as well as assuring that the anchoring device is plumb, as that term is used in the art, so as to thereby minimize if not eliminate the need to re-orient the anchoring device after the medium/concrete has set up thereby casting the anchoring device in place in the medium/concrete. This also avoids or at least minimizes the increased costs and schedule delays that occur using conventional building practices, techniques and equipment. The size, configuration, arrangement and makeup of such an anchor plumb device 100 also is such that existing skills of the worker can be easily adapted to use such an anchor plumb device in the field.

Such an anchor plumb device 100 according to the present invention also can be used after the medium/concrete has set up to easily and accurately determine the final, as-built location of each anchoring device. This allows quick verification of the acceptability of the positioning/location of each anchoring device in advance of the placement of structural members/steel. Using conventional techniques one usually has to determine the location of a reference point on the template holding the anchoring device(s) (e.g., an intermediary reference point) and from this determine the location of the anchoring device with respect to this reference point.

As shown in FIG. 3, the first member 110 includes a proximal end 114, a distal end 112, a main portion 116 and a long axis 117 or longitudinal axis that extends between the proximal and distal ends. Also, the main portion 116 has a length extending along the long axis. In more particular embodiments, the length of the main portion is established so that a worker can generate a sufficient force/torque when manipulating the first member in the field to move the anchoring device 20 when it is disposed in the medium/concrete to a plumb condition. It is within the scope of the present invention, for a worker to couple the first member or a portion thereof to another tool or device to generate the force or torque necessary to move the anchoring device 20.

This moving of the anchoring device 20 can be done without having to pull upwardly on the anchoring device so it is sufficiently removed from the medium/concrete such that the exposed anchoring device can be manipulated into what is believed to be vertically plumb condition and then inserted back into the medium/concrete as is done with conventional techniques. As the anchoring device is not being pulled upwardly and then re-inserted into the medium/concrete when using the anchor plumb device 100 of the present invention, one can avoid or substantially minimize the chance that the anchoring device after being manipulated using such an anchor plumb device will be in an out of plumb condition.

Figure 6:
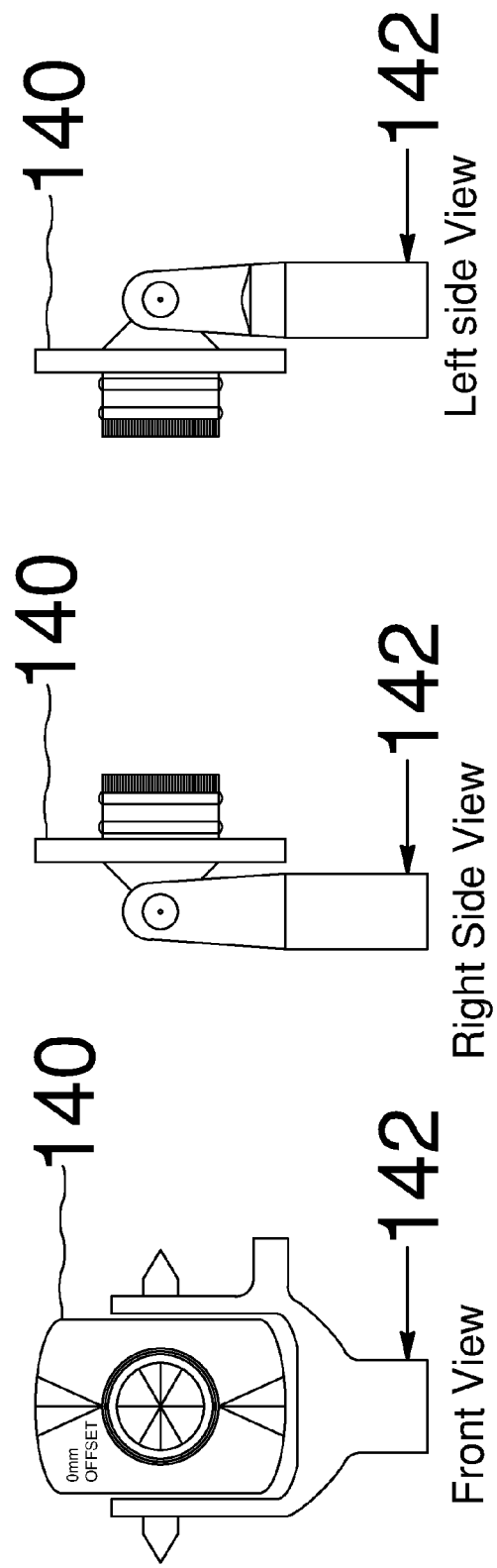
FIGS. 6A-C are a front view (FIG. 6A), right side view (FIG. 6B) and left side view (FIG. 6C) respectively of a peanut prism.

The proximal and distal ends 114, 112 of the first member 110 are each respectively configured and arranged so that they can be removably coupled or secured to another feature of the anchor plumb device. More particularly, the distal end 112 is configured and arranged so that it can be removably coupled to the second member 120 or adapter. More specifically, removably coupled to the proximal end 122*a* (FIGS. 4, 5) of the second member. When the anchor plumb device 100 is to be removably secured/coupled to a surveying device (e.g., peanut prism 140), the proximal end 114 of the first member 110 is configured and arranged so that it can be removably coupled to a mating end 142 (FIG. 6A) of the surveying device or peanut prism 140.

The first member 110 also is configured and arranged (e.g., have a thickness) and is made of a metal such as steel, stainless steel, aluminum, titanium or other materials (e.g., composites) that are appropriate for the intended use and that can withstand the loads, forces and torques being developed. More particularly withstand the loads, forces and torques being created/developed when the user or construction worker is manipulating the anchor plumb device 100 or the lever arm formed by the structure of such a device such as when trying to re-orient the anchoring device in the poured medium/concrete so that the anchoring device is in a plumb condition.

In exemplary embodiments, the first member 110 forms a cylindrical structure such as a solid rod or a hollow tubular member (such as that shown in FIG. 3). It is within the scope of the present invention for the first member to be present any of number of configurations or shapes (e.g., hexagonal, octagonal, etc.) as are known to those skilled in the art and otherwise appropriate for the intended use. The proximal and distal ends 114, 112 of such a cylindrical structure also are respectively and appropriately configured and arranged so as to present one part of the mechanism or means being used to removably couple or secure the first member to the mating end 142 of the surveying device or peanut prism 140 and to removably couple the distal end 112 to the second member proximal end 122a.

In illustrative, exemplary embodiments, such removable coupling is effected using any of a number of mechanical connections as are known in the art such as for example, threaded connections, ¼ turn connections or locking type of connection. Such connections also can be adapted to use other connection types, materials and/or sizes that are appropriate for the intended use and are appropriate for the construction practices, techniques and equipment in the particular country, state, county or region in which the construction work is being performed. For example, if the local practices contemplate metric units, then the sizing of the first and second members and any interconnections will be suitably sized using metric measurements/dimensions.

In illustrative embodiments, the surveying device mating end 142 includes a threaded aperture 121 of a known arrangement (e.g., diameter and threads per inch). In such a case, the first member proximal end 114 presents a first projection 115 (e.g., threaded stud) that extends outwardly from the main portion 116. More specifically, the long axis of the first projection 115 is aligned with the first member long axis 117 and the first projection is arranged so as to complement the threaded aperture 121.

In the illustrated embodiments, the second member proximal end 122a also forms an aperture 121 that can form a threaded connection or a ¼ turn connection. In the case of a ¼ turn connection, turning or rotating the second member 120 a ¼ turn or about ¼ of its circumference securely engages the second member and the first member 110. In such a case, the first member distal end 112 presents a second projection 113 (e.g., threaded stud) that extends outwardly from the main portion 116. More specifically, the long axis of such a second projection is aligned with the first member long axis and the threaded projection is arranged so as to complement the threaded or ¼ turn connection embodied in the second member distal end 122a.

In further illustrative embodiments, the main portion 116 is a hollow tubular member such as shown in FIG. 3, having an internal diameter and wall thickness. As indicated herein, the internal diameter and wall thickness are established so that the tubular member has sufficient rigidity so as to be capable of withstanding the loads/forces and/or torques being developed as the anchor plumb device is being manipulated by the worker/user.

In this case, a first interconnecting structure 118a is secured within the first member proximal end 114, the first interconnecting structure including the first projection 115. Such a first interconnecting structure 118a can take any of a number of forms that are appropriate for the intended use. For example and as shown in FIG. 3, the first interconnection structure 118a can comprise a solid member or stud having an aperture therein for securely receiving the first projection 115. In an alternative embodiment, the first interconnecting structure 118a can comprise a solid member that is machined to form a two part structure; one part for insertion into the tubular member comprising the first member 110 and a second part forming the first projection 115. It is well within the skill of those knowledgeable in the arts to arrive at different configurations and arrangements for the first interconnecting structure 118a including those where the surveying device uses a different connecting mechanism (e.g., a projecting stud).

The solid member or stud of the first interconnecting structure 118a is secured within the tubular member forming the first member 116 using any of a number of techniques known to those skilled in the art and appropriate for the intended use and the materials being used (e.g., TIG or MIG welding, brazing, or adhesives). The first interconnection structure including the solid member or stud and the first projection 115 can be any of a number of materials known in the art and appropriate for the intended us including metal, plastic and composites. As the first interconnecting structure 118a is being coupled to the surveying device or peanut prism 140, this connection should not be subjected to the loads imposed on the first member 110 when it is being manipulated.

In addition, a second interconnecting structure 118b is secured within the first member distal end 112. The second interconnecting structure 118b including the second projection 113. As provided in the above discussion regarding the first interconnecting structure 118a, the second interconnecting structure 118b can take any of a number of forms that are appropriate for the intended use. Reference shall be made to the foregoing discussion for the first interconnecting structure 118a as to the details for the second interconnecting structure, however, the materials and arrangement for the second interconnecting structure are limited to that which is appropriate for the loads imposed on the first member 110 when it is being manipulated.

As also shown in FIG. 3, a leveling mechanism 130 or a plumbing mechanism is secured to the first member 110. More particularly, the leveling mechanism is secured to the first member so that it provides indicia that are representative of the vertical direction of the first member long axis 117 and thus also the vertical direction of the anchoring device 20 that is secured to anchor plumb device 100. More specifically, the leveling mechanism 130 is a bubble level device that is configured and arranged so as to allow the anchoring device to be leveled in two directions. In this way, one can determine from the leveling mechanism 130 if the anchor plumb device is plumb and thus also determine if the respective anchoring device 20 is plumb.

In alternative embodiments, the leveling mechanism 130 can comprise a plurality of bubble level devices that are each arranged so as to be disposed along the first member long axis 117 and so as to be about orthogonally spaced from each other. Each bubble level device provides an indicia representative of the orientation of the first member long axis 117 with respect to a given plane of reference. Referring to the plurality of bubble level device allows the anchoring device 20 to be leveled in two directions. It should be recognized, that other leveling mechanisms as are known in the art, such as digital leveling mechanisms can be adapted for use as a leveling mechanism of the present invention.

The leveling mechanism 130 is secured to the first member main portion 116 using any of a number of techniques known to those skilled in the art and appropriate for the intended use. Also, the leveling mechanism is disposed at a location along the first member long axis 117 which can provide the representative indicia of the plumbness of the first member 110 and thus the plumbness of the anchoring device.

In illustrative exemplary embodiments, the leveling mechanism 130 is a level bubble assembly comprising a case made of a plastic material with a glass cover with circular lines at the center encasing a closed system filled with alcohol, allowing the visual inspection of the centering air bubble within the assembly thereby permitting the user or worker using the anchor plumb device 100 to plumb up the anchor plumb device and thus the anchoring device (e.g., anchor bolt). This level bubble assembly, more particularly the case, is friction clamped to the main portion 116. In further embodiments, the level bubble assembly further include a mechanism (e.g., 3 screws) being configured and arranged to adjust the bubble within the case allowing the user to recalibrate the bubble to the tool for accuracy and longer life of anchor plumb devices.

Referring now to FIGS. 4-5, there are shown cross-sectional side views along the long axis of a second member 120a, b or an anchor device adapter according to the present invention. Such a second member 120a, b includes a proximal end 122a and a distal end 124a, b as well as a long axis or longitudinal axis that extends between the proximal and distal ends.

The proximal and distal ends 122a; 124a, b of the second member 120 are each respectively configured and arranged so that second member proximal end can be removably coupled to the first member distal end 112 and so that the second member distal end 124a, b can be removably coupled to an exposed portion of the anchoring device 20. Reference shall be made to the above discussion regarding the first member 110 as to the details of the second member proximal end not otherwise provided in the following discussion.

As described herein, when the second member 120 is coupled to the first member 110 the combination forms a unitary structure. More particularly, a unitary structure that can handle the loads, forces and torques being created/developed when the user or construction worker is manipulating the anchor plumb device 100 or the lever arm formed by the structure of such a device such as when trying to re-orient the anchoring device in the poured medium/concrete so that the anchoring device is in a plumb condition.

The second member 120, like the first member 110, is made of metal such as steel, stainless steel, aluminum, titanium or other materials (e.g., composites) that are appropriate for the intended use and that can withstand the loads, forces and torques being developed. In exemplary embodiments, the second member 120 forms a cylindrical structure such as shown in either of FIGS. 4-5. It is within the scope of the present invention for the second member 120 to be present any of number of configurations or shapes (e.g., hexagonal, octagonal, etc.) as are known to those skilled in the art and otherwise appropriate for the intended use. In more specific embodiments, the second member 120 has the same general structure (e.g., cylindrical) as the first member 110.

The distal ends 124a, b of the second member are respectively and appropriately configured and arranged so as to present one part of the mechanism or means being used to removably couple or secure the exposed portion of the anchoring device 20 to the second member. In this regard, the exposed portion of the anchoring device 20 is that portion of the anchoring device that extends above the template 30 that is resting on the spreader 40 (FIGS. 7-9) of the footing. More specifically, the exposed portion refers to that part of the anchoring device that extends above the nut 21 that is above the template 30 and is connected to anchoring device.

In an illustrative, exemplary embodiment such as shown in FIG. 4, the distal end 124a is configured so as to include a threaded aperture 125a that is sized, configured and arranged so as to complement a threaded exposed portion of the anchoring device 20. More particularly, the aperture has an inner diameter that corresponds to the outer diameter of the anchoring device and a thread specification (e.g., threads per inch of axial length) that also complements the threading of the anchoring device. In illustrative embodiments, such anchoring devices are anchoring bolts having an outer diameter of ¾ inch or more, more particularly a diameter of one of ¾ inch, 1 inch or 1½ inches.

In another illustrative, exemplary embodiment such as shown in FIG. 5, the distal end 124a is configured so as to include an aperture 125b that is sized, configured and arranged so as it is slidably coupled to the threaded exposed portion of the anchoring device 20. More particularly, the aperture has an inner diameter that corresponds to the outer diameter of the anchoring device and is such as to provide contact with the outer surfaces of the threads of the anchoring device. Such contact is sufficient to allow the anchoring device to slide within the aperture 125b but also to reduce the radial movement of the anchoring device within the aperture. As indicated herein, in illustrative embodiments, such anchoring devices are anchoring bolts having an outer diameter of ¾ inch or more, more particularly a diameter of one of ¾ inch, 1 inch or 1½ inches.

In yet further embodiments, the second member 120a,b has a width or diameter that is sufficient to be coupled with the respectively sized anchoring device 20 or anchor bolt and that can withstand the loads, forces and torques being developed when the anchor plumb device is used to manipulate the anchoring device into a plumb condition.

In yet more particular embodiments, the second member can comprise a solid member such as shown in FIG. 4 or a hollow tubular member as shown in FIG. 5. When the second member 120a comprises a solid member, the threaded apertures 121, 125a are preferably formed or machined in the solid material. When the second member 120a comprises a hollow tubular member the threaded apertures 121, 125a can be formed in the solid material and/or be provided another structure that is joined to the tubular member such as that described above for the first member 110.

In more particular embodiments, the anchor plumb device 100 comprises a kit having a plurality of second members 120a, b and at least one first member 110. At least one of the second members 120a is configured and arranged so it can be coupled to a different diameter anchoring device than another of the plurality of second members 120a. In further embodiments, the plurality of second members 120a, b can comprise not only differently sized anchoring members but rather either type of second members 120a, b as shown in FIGS. 4 and 5.

In more illustrative exemplary embodiments, the aperture 121 in the second member proximal end 122a is threaded with a course thread to allow a quarter turn joining of the respective first and second members. The second aperture 124a will be one of a diameter of 1½" threaded at a standard American thread of 6 threads per inch, a diameter of 1" threaded to a standard American thread of 8 threads per inch or a diameter of ¾" threaded to a standard American thread of 11 threads per inch. In the case of the second aperture 124b, the second member distal end 124b is bored to a 1½ inch diameter to allow the second member to sleeve over an anchor bolt with a diameter of 1½ inches or bored to a 1 inch diameter to allow the second member to sleeve over an anchor bolt with a diameter of 1 inch or bored to a ¾ inch diameter to allow the second member to sleeve over an anchor bolt with a diameter of ¾ inch.

Figure 7:
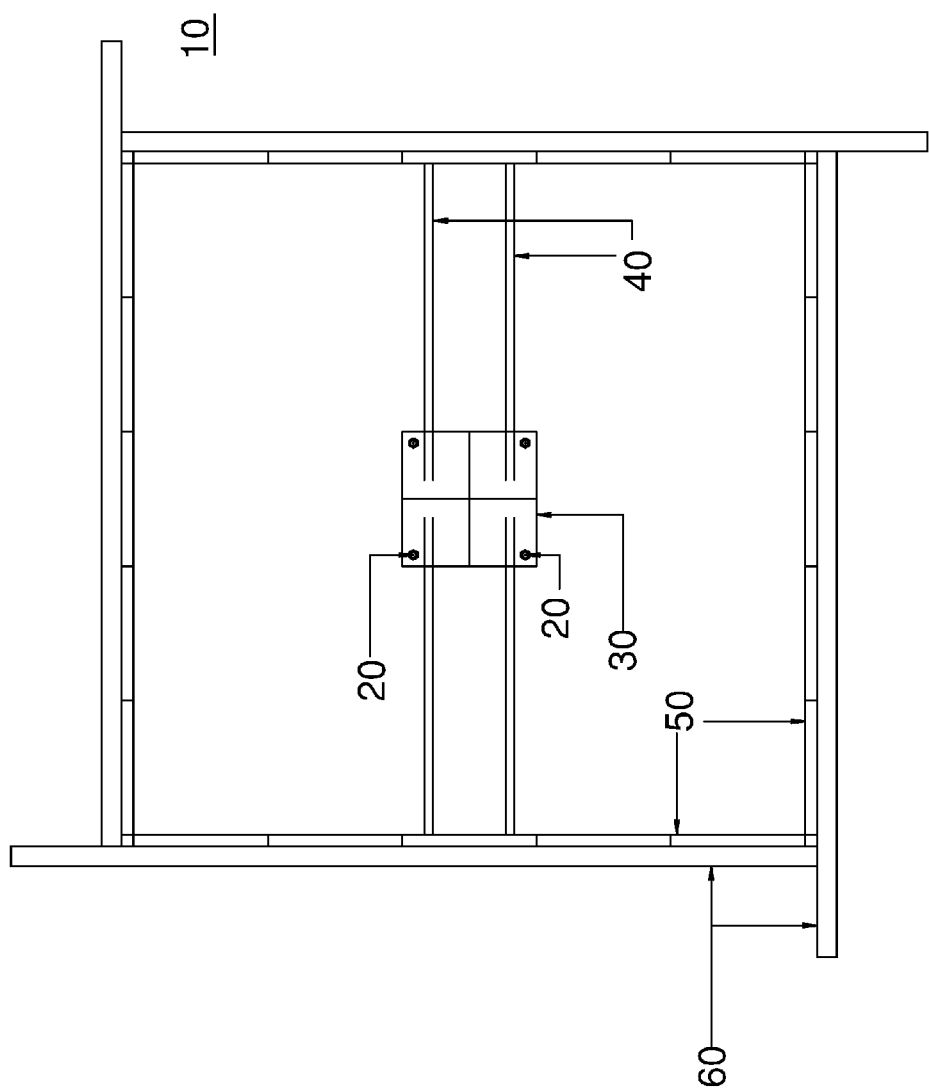
FIG. 7 is plan view of a spread footing arranged devices for pouring of concrete.

Referring now to FIG. 7 there is shown a plan view of a spread footing for receiving therein concrete (poured concrete) and in which are arranged anchoring devices 20 which are to be cast in place when the concrete sets up or hardens. This also is a plan view of an interior spread footing. In this illustration, the footing is formed by a typical Symons form work system 10 that includes forms 50 that are braced or whaled by whalers 60 which can be for example 2"×4" wood studs or members. At the center of the spread footing is an anchor bolt template 30 that is supported by a plurality of spreaders 40. One or more anchoring devices 20, more particularly four anchor bolt assemblies, are secured to the anchor bolt template 30. The supporting nut 22, keep each of the anchor bolts 22 from falling through the anchor bolt template 30, into the medium or concrete below.

The spreaders are any of a number of sized members that are appropriate for the intended use and service. In illustrative embodiments, the spreaders are wooden members or studs such as 2×4, 2×6, 2×8 and the like.

Figure 8:
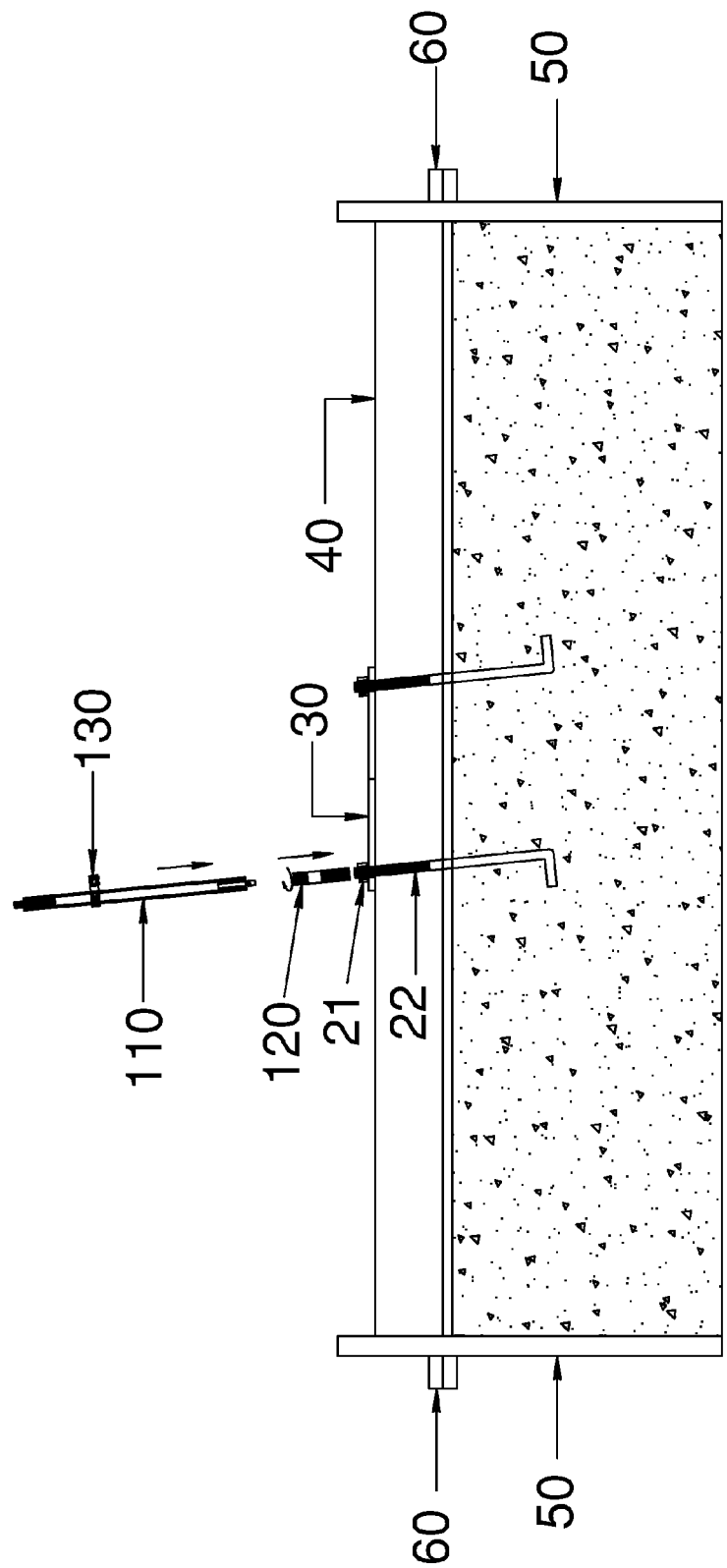
FIG. 8 is a section view of the spread footing of FIG. 7 illustrating out of normal anchoring devices and the process of attaching the anchor plumb device to the anchoring device.

Referring now to FIG. 8 a section view of the spread footing of FIG. 7 is shown that illustrates out of normal anchoring devices and the process of attaching the anchor plumb device to the anchoring device. This section view also shows the placing of the concrete into the Symons forms 50 that are whaled or braced by whalers 60 such as wooden studs or members as well as other materials as are known in the arts for such use. This section view also shows the flowing concrete moving the anchor bolts 22, out of plumb as they should have been initially in a plumb condition or state prior to pouring of the concrete. Please note that the spreaders 40 keep the anchor bolt template 30 close to the desired position during concrete placement.

Figure 9:
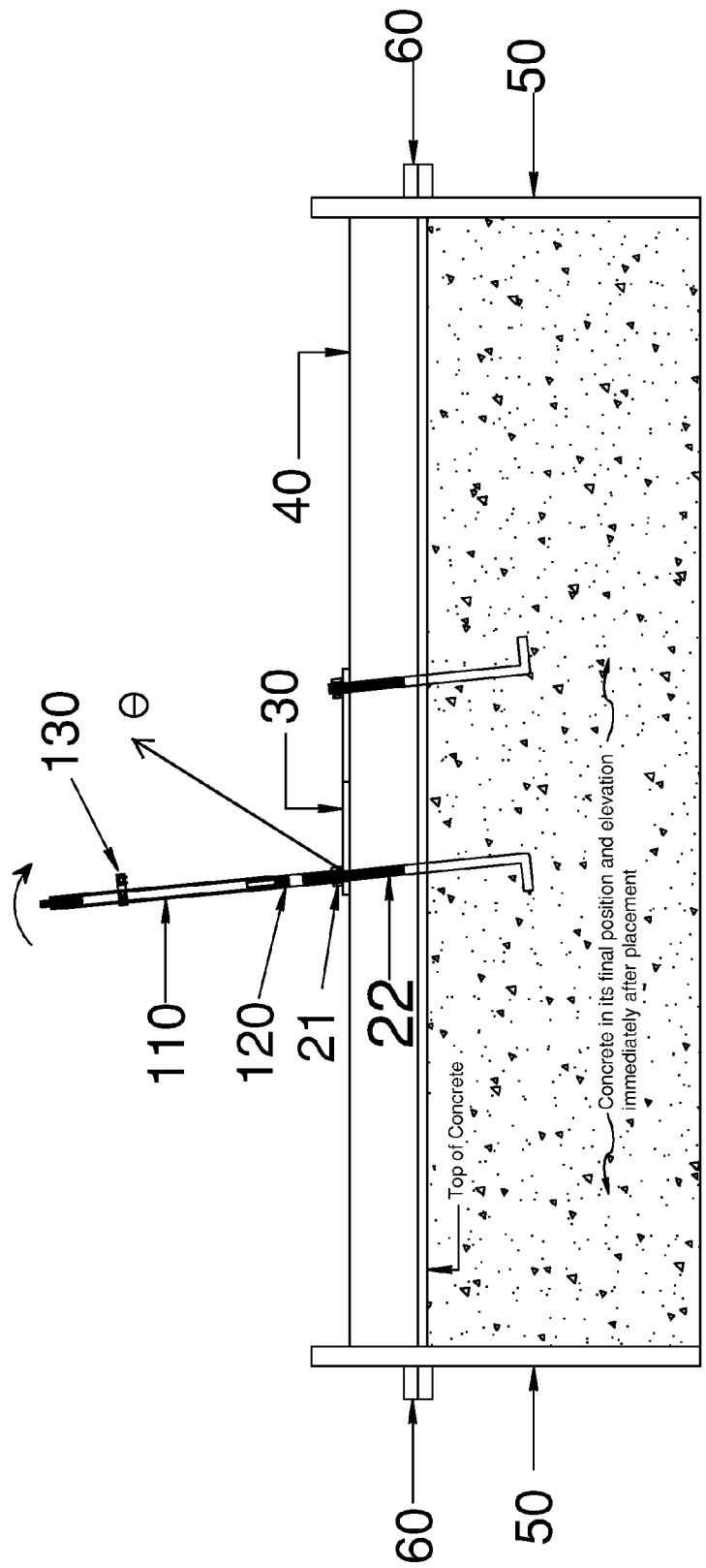
FIG. 9 is another section view of the spread footing of FIG. 7 illustrating a process for re-orienting the anchoring device using the anchor plumb device of the present invention.

Referring now to FIG. 9 there is shown another section view of the spread footing of FIG. 7 illustrating a process for re-orienting the anchoring device using the anchor plumb device of the present invention as well as showing placement of the concrete placed to the finish elevation. After pouring of the footing is complete, one straightens and aligns the form(s) by standard formwork practices. Engineers or surveyors then readjust the anchor bolt template 30 to its desired location using any of a number of techniques known to those skilled in the arts.

Thereafter, the user or worker takes the necessary actions to couple the anchor plumb device 100 to the exposed portion of the anchoring device, more particularly, the portion of the anchor bolt 22 that extends above the nut. In particular embodiments, this is accomplished by threading the second member distal end 124a onto the exposed threaded portion of the anchor bolt 22 or sleeving the second member distal end 124b over the exposed threaded portion of the anchor bolt 22. Thereafter, the first member distal end 112 is coupled to the second member proximal end 122a as herein described. For example, the second projection 113 of the first member 110 is pushed down into the aperture 121 provided in the second member proximal end 122a and then rotating or spinning the first member such as in a clockwise direction a quarter turn so as to thereby attach or couple the first member to the second member. It should be recognized that it is within the scope of the present invention to couple the first and second members 110, 120 together and then couple the combination or the formed unitary structure to the exposed portion of the anchoring device or anchor bolt. If the anchoring device or anchor bolt to which it is coupled is not plumb, then the anchor plumb device 100 should be at an angle (θ) with respect to the template 30 as shown in FIG. 9.

After coupling of the first and second member 110, 120 to form the anchor plumb device according to the present invention and the coupling thereof to the anchoring device, the user pushes or pulls the anchor plumb device 100 with respect to a radial direction of the first member long axis 117 and/or rotates the anchor plumb device about the first member long axis so as to move the anchoring device until it reaches a plumb position, state or condition. The user or worker determines that the anchoring device or anchor bolt is in the plumb position, state or condition by reference to the leveling mechanism 130 that is secured to the first member. In illustrated embodiments, when the leveling mechanism 130 comprises a level bubble assembly that can level in two directions, the worker manipulates the first member 110 until the bubble in the level bubble assembly is centered.

Figure 10:
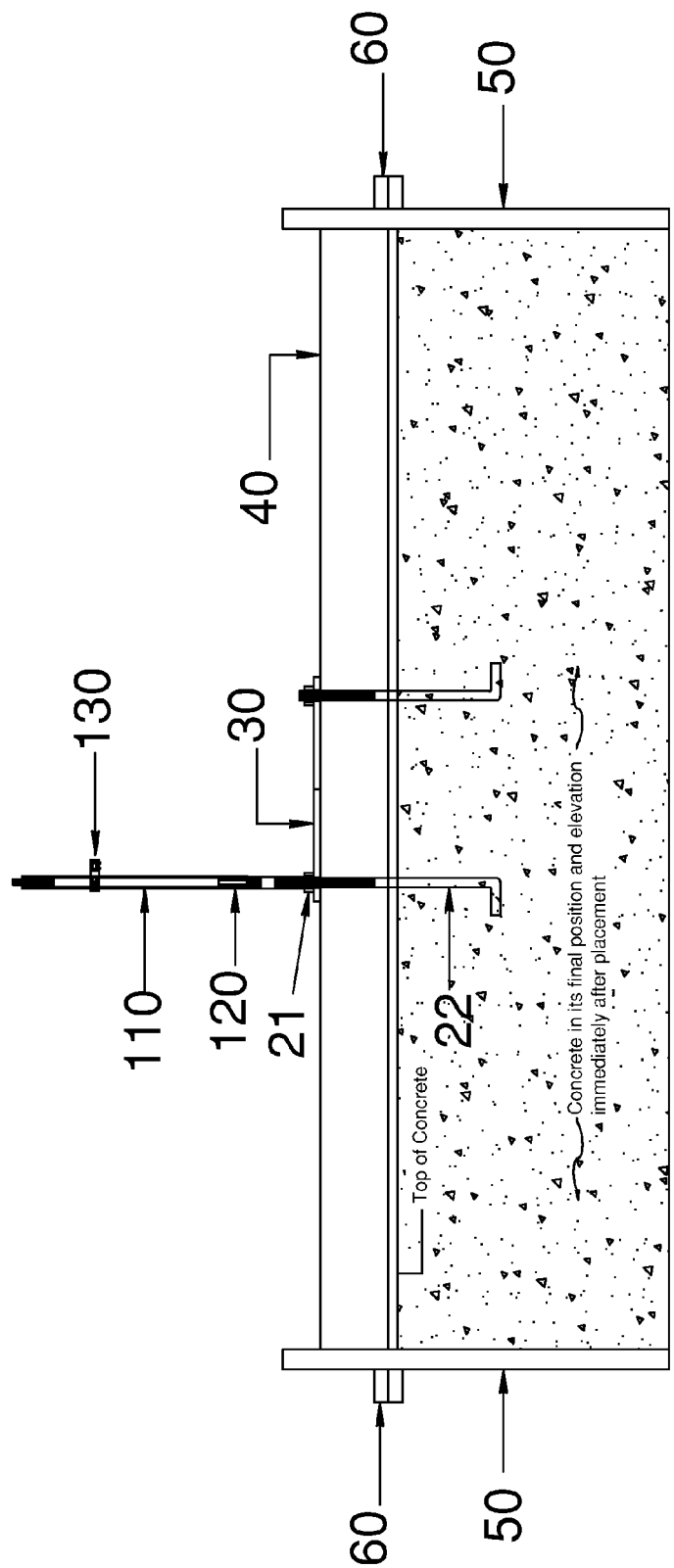
FIG. 10 is another section view of the spread footing of FIG. 7 illustrating an anchoring device and the anchor plumb device when re-orientated into a plumb condition.

Referring now to FIG. 10 there is shown another section view of the spread footing of FIG. 7 illustrating an anchoring device 20 and the anchor plumb device 100 when re-orientated into a plumb state, condition or position. After the respective anchoring device 20 or anchor bolt has been plumbed, the anchor plumb device 100 is de-coupled or removed from the anchoring device. In illustrative embodiments, the first member is de-coupled from the second member such as by firmly holding the second member 120 and turning the first member counter clock wise and pulling up thereby separating the first and second members.

After de-coupling of the first and second members 110, 120, the second member 120 is then decoupled from the anchoring device. For example, the second member is rotated in a counter clockwise direction (e.g., unthreading the second member from the anchoring device) until the second member is separated from the Anchor bolt.

The above described process is repeated for each of the four anchor bolts attached or secured to the anchor template 30 until all four bolts are plumbed.

Referring now to FIG. 11 there is shown another section view of the spreading footing with the anchoring devices 20 cast in place and the anchor plumb device of the present invention configured for as-building the final locations of the anchoring devices. As described herein, after the concrete hardens a process is undertaken to as-built the locations of each of the anchoring devices so as to at least verify that the cast in place anchoring devices are at the desired or intended locations. This is done by again coupling the first and second members 110, 120 together to form an anchor plumb device 100 as herein described. In more particular embodiments, the second member 120b being used is that configured to sleeve over the anchoring device or exposed portion of the anchoring device. A surveying device such as peanut prism 140 is coupled to the first member proximal end 114 as herein described.

After such coupling, the anchor plumb device with the sleeved end, is set down upon a previously plumbed anchoring device 20 or anchor bolt that is in hardened and cured concrete. Using the peanut prism and any of a number of other surveying devices or surveying instruments as are known in the art, such as a transit or total station which embodies an electronic distance meter (EDM), one reads the horizontal, vertical, and/or slope distances to a point in space. In this way, the location of the anchor plumb device 100 and thus the location of the anchoring device it is coupled to can be easily and accurately determined with respect to a spatial reference point. More particularly, such a position of the anchoring device can be directly determined using the anchor plumb device of the present invention. More specifically, the position of the anchoring device is determined in one dimension, two dimensions or three dimensions with respect to the spatial reference point.

After acquiring the information for one anchoring device, the user decouples the anchor plumb device from the anchoring device (e.g., slides the second member distal end off of the anchoring device). If there are other anchoring devices requiring as-building, then the user couples the anchor plumb device 100 to another anchor anchoring device or anchor bolt and repeats the process describe above. This is repeated until all of the anchoring devices in hardened and cured concrete have been checked. \

From this acquired information, one can as-built locations thereby confirming anchor bolt pattern, and location for erection of the structural steel members/columns.

Thereafter and after the plumb anchoring devices 20 or anchor bolts are confirmed as being in their completed and final state and ready for a structural steel column to be set down, a steel leveling plate 90 is set to the desired elevation per the structural drawings. Typically, the leveling plate is supported typically by a 5,000 PSI non shrink grout located between the top surface of the concrete and the bottom surface of the leveling plate. Thereafter, the construction process can begin with the installation of structural elements.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A device for plumbing an anchoring device in a cast in place medium so the anchoring device is arranged so as to be in a desired vertical orientation, wherein the device comprises:
a first member having a proximal end, a distal end and a long axis;
a second member having a proximal end and a distal end;
a leveling mechanism being secured to the first member so that the leveling mechanism provides one or more indicia representative of the orientation of the first member long axis with respect to a vertical reference;
wherein the second member distal end is configured and arranged so as to be removably coupled to an end portion of the anchoring device;
wherein the second member proximal end and the first member distal end are respectively configured and arranged so that the first and second members are removably coupled to each other and so as to form an essentially unitary structure; and
wherein the indicia provided by the leveling mechanism also is representative of a vertical orientation of the anchoring device when disposed in the medium when the so-coupled first and second members are removably coupled to the anchoring device.

2. The device of claim 1, wherein:
the anchoring device end portion is arranged so as to form a threaded end; and
the second member distal end includes a threaded aperture that is configured and arranged so as to threadably engage the threaded anchoring device end portion thereby removably coupling the second member distal end to the anchoring device end portion.

3. The device of claim 1, wherein the second member distal end includes a aperture that is configured and arranged so as to slidably engage opposing surfaces of the anchoring device end portion thereby removably coupling the second member distal end to the anchoring device end portion.

4. The device of claim 1, wherein the first member includes a length along the long axis that is sufficient to allow the user to manipulate the anchoring device when disposed in the medium so the user can orient the anchoring device in at least the vertical direction so as to thereby plumb the anchoring device.

5. The device of claim 1, wherein the leveling mechanism is a bubble level device that is configured and arranged so as to allow the anchoring device to be leveled in two directions.

6. The device of claim 1, wherein:
the leveling mechanism includes a plurality of bubble level devices that are each arranged so as to be disposed along the first member long axis and so as to be about orthogonally spaced from each other; and
each bubble level device provides an indicia representative of the orientation of the first member long axis with respect to a given plane of reference, thereby allowing the anchoring device to be leveled in two directions by the so-coupled first and second members.

7. The device of claim 1, further comprising a locating device that is useable to determine the location of the locating device with respect to a spatial point of reference; and
wherein the first member proximal end is configured and arranged so to be removably coupled to the locating device so as to be located at a known location with respect to the first member long axis.

8. The device of claim 7, wherein the locating device is arranged on the first member such that the determined location of the locating device is representative of the location of the anchoring device with respect to the spatial point of reference.

9. The device of claim 1, wherein the so-coupled first and second members also are arranged to form a lever arm that is removably coupled to the anchoring device whereby a user can manipulate the anchoring device coupled thereto when disposed in the medium using the lever arm so the coupled anchoring device is placed in a plumb vertical orientation.

10. A method for plumbing an anchoring device having a long axis that is disposed in medium before the medium sets up, such a method comprising the step(s) of:
removably coupling a proximal end of a second member having a long axis to a distal end of a first member also having a long axis so as to form a unitary structure where the long axis of each of the first and second members is generally aligned with each other;

securing a leveling mechanism to the first member so that the leveling mechanism provides one or more indicia representative of the orientation of the first member long axis with respect to a vertical reference;

removably coupling a distal end of the second member to an exposed portion of the anchoring device after pouring of the medium, whereby the leveling mechanism thereby provides one or more indicia representative of the orientation of the anchoring device long axis with respect to the vertical reference;

determining from the leveling mechanism if the anchoring device is plumb;

in response to determining that the anchoring device is not plumb, manipulating the coupled first and second members so as to thereby also manipulate the anchoring device while disposed in the medium; and repeating said steps of determining and manipulating until it is determined that the anchoring device is in a plumb condition.

11. The method for plumbing an anchoring device of claim 10, wherein said removably coupling the second member distal end to the anchoring device exposed portion includes:

configuring the anchoring device end portion so as to form one portion of a threaded connection;

configuring the second member distal end so as to include another portion of a threaded connection; and threadably engaging the one portion and said another portion thereby removably coupling the second member distal end to the anchoring device end portion.

12. The method for plumbing an anchoring device of claim 10, wherein the second member distal end includes an aperture that is configured and arranged so as to slidably engage opposing surfaces of the anchoring device end portion; and wherein said removably coupling the second member distal end to the anchoring device exposed portion includes engaging the anchoring device end portion in the aperture thereby removably coupling the second member distal end to the anchoring device end portion.

13. The method for plumbing an anchoring device of claim 10, further comprising configuring the first member so as to have a length along the long axis that is sufficient to allow a user to manipulate the anchoring device when disposed in the medium so the user can orient the anchoring device in at least the vertical direction so as to thereby plumb the anchoring device.

14. The method for plumbing an anchoring device of claim 10, wherein the leveling mechanism is a bubble level device that is configured and arranged so as to allow the anchoring device to be leveled in two directions; and wherein said determining from the leveling mechanism if the anchoring device is plumb includes using the bubble level device to determine if the anchoring device is plumb.

15. The method for plumbing an anchoring device of claim 10, further comprising coupling a locating device that is useable to determine the location of the locating device with respect to a spatial point of reference on the first member proximal end, wherein the locating device is located at a known location with respect to the first member long axis.

16. The method for plumbing an anchoring device of claim 10, wherein a plurality of anchoring devices are disposed about a given location in the medium; and wherein:

said removably coupling includes removably coupling a proximal end of each of a plurality of second members to a distal end of each of a plurality of respective first members so each so coupled first and second members form a unitary structure;

said securing a leveling mechanism includes securing the leveling mechanism to each of the plurality of first members so that the leveling mechanism provides one or more indicia representative of the orientation of the respective first member long axis with respect to vertical reference;

said removably coupling includes removably coupling the distal end of each of the plurality of second members to an exposed portion of a respective one of the plurality of anchoring devices after pouring of the medium, whereby the leveling mechanism thereby provides one or more indicia representative of the orientation of the respective anchoring device long axis with respect to the vertical reference;

wherein said determining includes determining from the leveling mechanism if each of the plurality of anchoring devices is plumb;

in response to determining that a respective anchoring device is not plumb, manipulating the coupled first and second members so as to thereby also manipulate the respective anchoring device while disposed in the medium; and said repeating said steps of determining and manipulating includes repeating said steps of determining and manipulating until it is determined that the respective anchoring device is in a plumb condition and until it is further determined that each of the plurality of anchoring devices is in a plumb condition.

17. The method for plumbing an anchoring device of claim 10, wherein a plurality of anchoring devices are disposed about a given location in the medium; and successively repeating the following for each of the plurality of anchoring devices:

wherein said removably coupling the distal end of the second member includes removably coupling the second member distal end to an exposed portion of a respective one of the plurality the anchoring device after pouring of the medium, whereby the leveling mechanism thereby provides one or more indicia representative of the orientation of the respective one anchoring device long axis with respect to the vertical reference;

wherein said determining includes determining from the leveling mechanism if the respective one of the anchoring devices is plumb;

wherein in response to determining that a respective one of the anchoring devices is not plumb, manipulating the coupled first and second members so as to thereby also manipulate the respective one of the anchoring devices while disposed in the medium; and repeating said steps of determining and manipulating until it is determined that the respective one of the anchoring devices is in a plumb condition; and wherein, responsive to a determination that the respective one of the anchoring devices is plumb, decoupling the second member distal from the exposed portion of the respective one of the plurality the anchoring devices.

18. The method for plumbing an anchoring device of claim 10, wherein:

the leveling mechanism includes a plurality of bubble level devices that are each arranged so as to be disposed along the first member long axis and so as to be about orthogonally spaced from each other;

each bubble level device provides an indicia representative of the orientation of the first member long axis with respect to a given plane of reference, thereby allowing the anchoring device to be leveled in two directions; and said determining from the leveling mechanism if the anchoring device is plumb includes using the plurality of bubble level devices to determine if the anchoring device is plumb.

19. A method for determining the location of an anchoring device having a long axis with respect to a spatial point of reference, the anchoring device being disposed in a medium after the medium has set up, such a method comprising the step(s) of:

removably coupling a proximal end of a second member having a long axis to a distal end of a first member also having a long axis so as to form a unitary structure where the long axis of each of the first and second members is generally aligned with each other;

removably coupling a distal end of the second member to an exposed portion of the anchoring device the exposed portion not being located in the medium;

coupling a locating device on a proximal end of the first member, wherein the locating device is located at a known location with respect to the first member long axis; and using the so coupled locating device, determining the location of the locating device with respect to the spatial point of reference, where such determining also includes determining the location of the anchoring device with respect to the spatial point of reference.

20. The method for determining the location of an anchoring device of claim 19, further comprising:

securing a leveling mechanism to the first member so that the leveling mechanism provides one or more indicia representative of the orientation of the first member long axis with respect to a vertical reference; and determining from the leveling mechanism if the anchoring device is plumb.

21. The method for determining the location of an anchoring device of claim 19, wherein there a plurality of anchoring devices and wherein said method includes repeating said steps of removably coupling a proximal end of a second member, removably coupling a distal end of the second member, coupling a locating device and determining the locations of the locating device and anchoring device with respect to the spatial point of reference for each of the plurality of anchoring devices.

\* \* \* \* \*